(12) United States Patent
Clifford

(10) Patent No.: US 6,758,260 B2
(45) Date of Patent: Jul. 6, 2004

(54) HEATING, VENTILATING, AND AIR CONDITIONING ASSEMBLY FOR A VEHICLE

(75) Inventor: John W. Clifford, Gasport, NY (US)

(73) Assignee: Delphi Technologies, Inc., Troy, MI (US)

(*) Notice: Subject to any disclaimer, the term of this patent is extended or adjusted under 35 U.S.C. 154(b) by 54 days.

(21) Appl. No.: 10/271,496

(22) Filed: Oct. 15, 2002

(65) Prior Publication Data

US 2004/0069444 A1 Apr. 15, 2004

(51) Int. Cl.[7] .............................. F25B 29/00; B60H 1/00
(52) U.S. Cl. ........................ 165/42; 165/43; 165/103; 237/12.3 A; 237/12.3 B; 454/156; 454/160; 454/161
(58) Field of Search .......................... 165/42, 43, 103, 165/41; 237/12.3 A, 12.3 B; 236/13; 454/156, 160, 161

(56) References Cited

U.S. PATENT DOCUMENTS 4,452,301 A * 6/1984 Last et al. ..................... 165/42

FOREIGN PATENT DOCUMENTS

| JP | 5-131838 | * | 5/1993 |
| JP | 5-178066 | * | 7/1993 |
| JP | 6-270644 | * | 9/1994 |
| JP | 10-147131 | * | 6/1998 |
| JP | 11-334341 | * | 12/1999 |

* cited by examiner

Primary Examiner—John K. Ford
(74) Attorney, Agent, or Firm—Patrick M. Griffin

(57) ABSTRACT

A heating, ventilating, and air conditioning (HVAC) assembly having a housing defining first and second quadrants. An air mixing door is mounted to the housing downstream of an inlet and upstream of an outlet. The air mixing door has a first position directing substantially all of the air through the first quadrant, a second position directing substantially all of the air through the second quadrant, and a third position directing a flow of air through both of the first and second quadrants. A first seal is mounted to a first side of the air mixing door and a second seal is mounted to a second side of the air mixing door. A diffuser is mounted to at least one of the sides of the air mixing door and has a plurality of passageways to interrupt a flow of air passing around the air mixing door when the air mixing door initially moves from one of the first and second positions to the third position, thereby controlling an initial flow of air into at least one of the quadrants.

19 Claims, 8 Drawing Sheets

HEATING, VENTILATING, AND AIR CONDITIONING ASSEMBLY FOR A VEHICLE

BACKGROUND OF THE INVENTION

1. Field of the Invention

The subject invention relates to a heating, ventilating, and air conditioning assembly for a vehicle having an improved air mixing door.

2. Description of the Prior Art

Conventional heating, ventilating, and air conditioning (HVAC) assemblies include a housing having an inlet and a number of outlets. The outlets disperse a flow of air into various portions of a passenger compartment. An evaporator and a heater core are typically disposed downstream of the inlet and upstream of the outlets. The evaporator is designed to dehumidify and cool the air while the heater core is designed to heat the air. The housing can define a first quadrant, which receives the cooled air, a second quadrant, which receives the heated air, and a third quadrant, which can receive and blend both the cooled and heated air.

At least one air mixing door is typically mounted within the housing to control a flow of air throughout the various quadrants of the housing which transmits air of varied temperatures into the portions of the passenger compartment. The air mixing door often pivots between different positions to vary the temperature of the air flowing into the passenger compartment. The air mixing door also includes seals for seating against a full cooling seat and a full heating seat of the housing. Occasionally, when the air mixing door initially moves away from the full heating seats, a sudden rush of air passes over the air mixing door. This sudden rush of air creates an undesirable thermodynamic effect which is noticed by occupants within the passenger compartment.

Accordingly, it would be desirable to develop an air mixing door which significantly reduces and/or eliminates the sudden rush of air when the air mixing door moves from certain seated positions.

SUMMARY OF THE INVENTION AND ADVANTAGES

A heating, ventilating, and air conditioning (HVAC) assembly for heating, venting, and cooling a passenger compartment of a vehicle. The HVAC assembly comprises a housing having an inlet and at least one outlet for directing a flow of air into the passenger compartment. The housing defines first and second quadrants disposed between the inlet and outlet. At least one heat exchanger is disposed within the housing downstream of the inlet and upstream of the outlet. An air mixing door, having first and second sides, is mounted to the housing downstream of the inlet and upstream of the outlet. The air mixing door has a first position directing substantially all of the air through the first quadrant, a second position directing substantially all of the air through the second quadrant, and a third position, infinitely variable between the first and second positions which directs a flow of air through both of the first and second quadrants. A first seal is mounted to the first side of the air mixing door with the first seal seating against the housing when the air mixing door is in the first position. A second seal is mounted to the second side of the air mixing door with the second seal seating against the housing when the air mixing door is in the second position. A diffuser is mounted to at least one of the sides of the air mixing door. The diffuser has a plurality of passageways to interrupt a flow of air passing around the air mixing door when the air mixing door initially moves from one of the first and second positions to the third position, thereby controlling an initial flow of air into at least one of the quadrants.

Accordingly, the subject invention provides for a HVAC assembly having an air mixing door which includes a diffuser for significantly reducing and/or eliminating any sudden rush of air when the air mixing door moves from a full heat seated position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
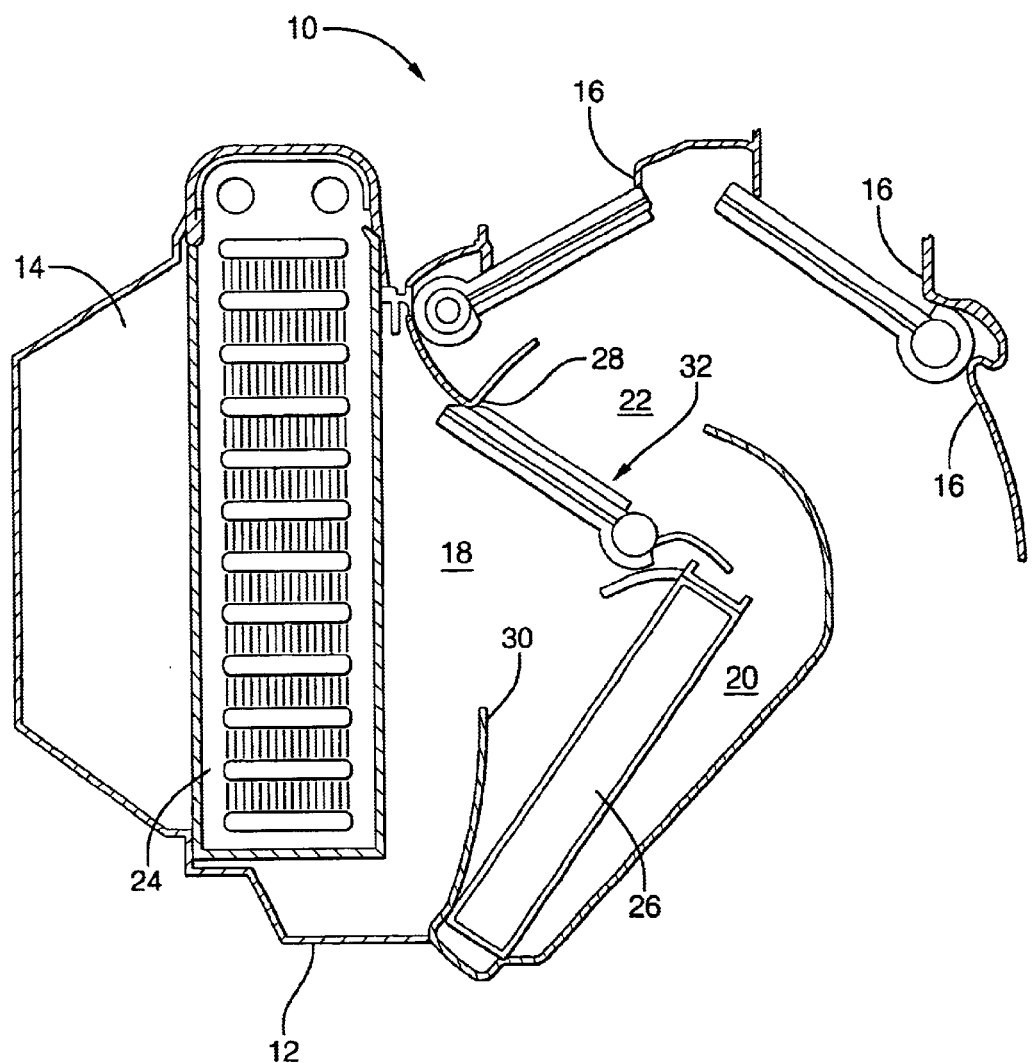
FIG. 1 is a cross-sectional view a heating, ventilating, and air conditioning (HVAC) assembly incorporating the aspects of the subject invention.

Referring to the Figures, wherein like numerals indicate like or corresponding parts throughout the several views, a heating, ventilating, and air conditioning (HVAC) assembly for heating, venting, and cooling a passenger compartment of a vehicle (not shown) is generally shown at 10 in FIG. 1. The HVAC assembly 10 comprises a housing 12 having an inlet 14 and at least one outlet 16 for directing a flow of air into the passenger compartment. Preferably, the housing 12 includes a plurality of outlets 16, such as three, for directing the flow of air into various portions of the passenger compartment.

The housing 12 also defines at least first 18 and second 20 quadrants disposed between the inlet 14 and outlet 16.

Preferably, the first quadrant 18 is positioned in an upper portion of the housing 12 to receive cooled air and the second quadrant 20 is positioned in a lower portion of the housing 12 to receive heated air. The housing 12 also defines a third quadrant 22 located downstream of both the first 18 and second 20 quadrants for selectively receiving and blending both the cooled and heated air.

At least one heat exchanger 24, 26 is disposed within the housing 12 downstream of the inlet 14 and upstream of the outlet 16 to cool and/or heat the air. In the preferred embodiment, the at least one heat exchanger 24, 26 includes both an evaporator 24 and a heater core 26 with the heater core 26 disposed downstream of the evaporator 24. The evaporator 24 is designed to dehumidify and cool the air passing into the first quadrant 18 and the heater core 26 is designed to heat the air passing into the second quadrant 20. Even more preferably, the evaporator 24 is arranged and configured to receive substantially all of the air passing through the housing 12 toward the outlets 16. Hence, substantially all of the air is cooled. The cooled air, however, can be subsequently heated by being directed through the heater core 26 and into the second quadrant 20.

A cooling aperture 28 is formed in the housing 12 between the first 18 and third 22 quadrants for allowing cool air to pass therethrough. A heating aperture 30 is formed in the housing 12 between the first 18 and second 20 quadrants for directing cool air from the first quadrant 18 through the heater core 26 and into the second quadrant 20. The arrangement and configuration of the housing 12, including the quadrants and apertures, is well known to those skilled in the art and as such is not discussed in any greater detail.

Figure 2A:
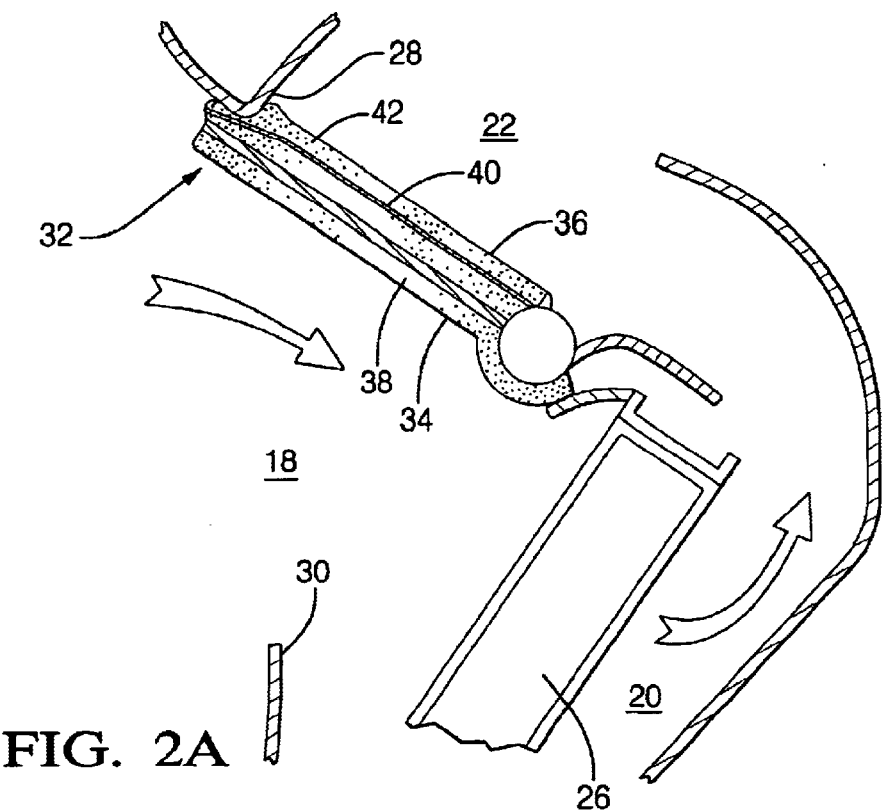
FIG. 2A is a cross-sectional view of an air mixing door in a second position.
Figure 2B:
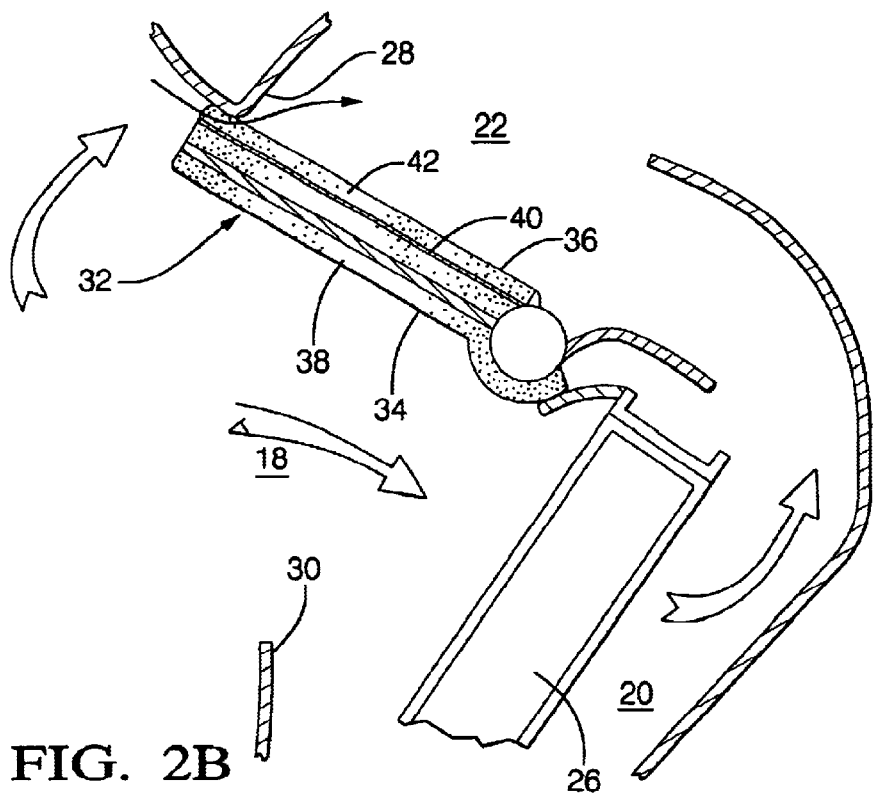
FIG. 2B is a cross-sectional view of the air mixing door of FIG. 2A in a third position.
Figure 2C:
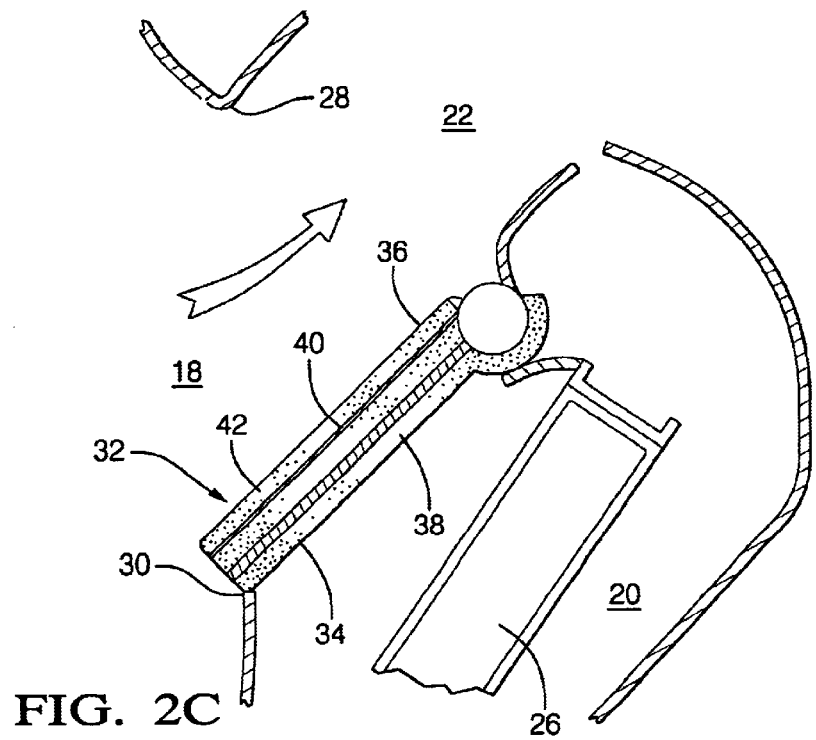
FIG. 2C is a cross-sectional view of the air mixing door of FIG. 2A in a first position.
Figure 2D:
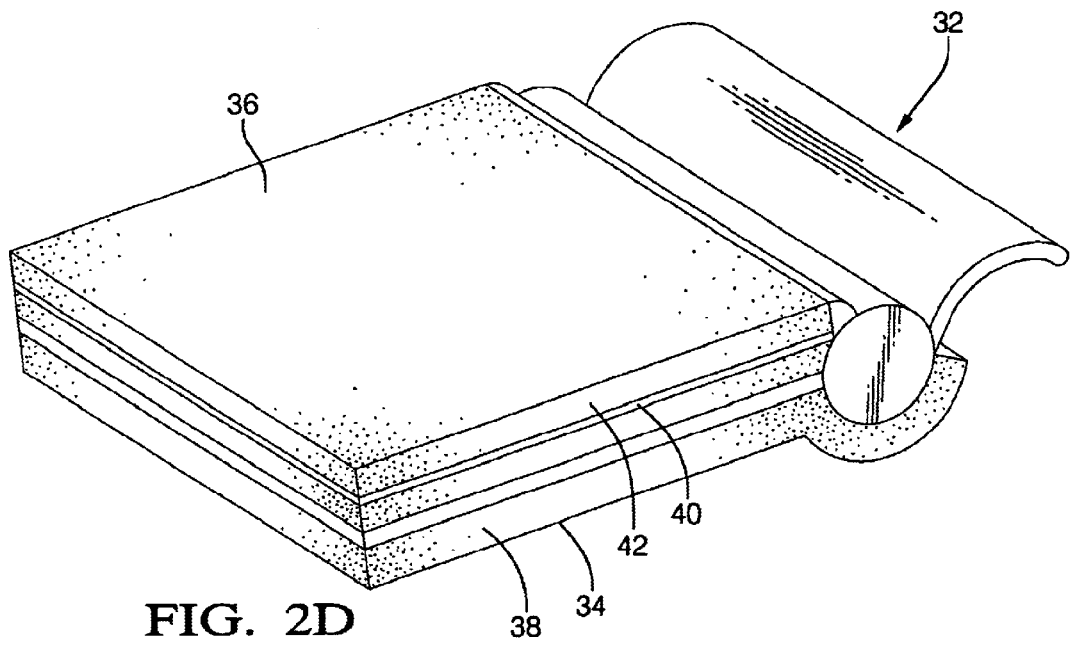
FIG. 2D is a perspective view of the air mixing door of FIG. 2A.

Referring also to FIGS. 2A–2C, an air mixing door 32, having first 34 and second 36 sides, is mounted to the housing 12 downstream of the inlet 14 and upstream of the outlet 16. Preferably, the air mixing door 32 is pivotally mounted to the housing 12 by any known device such that the air mixing door 32 can be remotely operated. As shown in FIG. 2C, the air mixing door 32 has a first position directing substantially all of the air through the first quadrant 18 and into the third quadrant 22. In this first position, the air mixing door 32 is seated against the heating aperture 30 which prevents air from passing into the heater core 26. The air therefore passes directly from the evaporator 24, through the first quadrant 18 and the cooling aperture 28, into the third quadrant 22, and out the outlets 16. This position of the air mixing door 32 is used during a full air conditioning condition of the HVAC assembly 10

As shown in FIG. 2A, the air mixing door 32 has a second position directing substantially all of the air through the second quadrant 20. In the second position, the air mixing door 32 is seated against the cooling aperture 28 which prevents air from passing through this cooling aperture 28. The air therefore passes directly from the evaporator 24 through the first quadrant 18 and the heating aperture 30, into the heater core 26, through the second quadrant 20, into the third quadrant 22, and out the outlets 16. This position of the air mixing door 32 is used during a full heating condition of the HVAC assembly 10.

As shown in FIG. 2B, the air mixing door 32 also has a third position directing a flow of air through both of the first 18 and second 20 quadrants. The air mixing door 32 is therefore somewhere between the first and second positions. In this third position, the air passes from the evaporator 24, through the first quadrant 18, through the cooling aperture 28 into the third quadrant 22, and through the heating aperture 30, heater core 26, and second quadrant 20 into the third quadrant 22, and then out the outlets 16. This position of the air mixing door 32 is used during any blend of temperatures between the full air conditioning and full heating conditions of the HVAC assembly 10.

The air mixing door 32 includes a first seal 38 mounted to the first side 34 and a second seal 40 mounted to the second side 36. The first seal 38 seats against the housing 12 when the air mixing door 32 is in the first position, i.e., the full air conditioning condition, and the second seal 40 seats against the housing 12 when the air mixing door 32 is in the second position, i.e., the full heating condition. In order to prevent substantially all of the air from passing through one of the apertures 28, 30, the first 38 and second 40 seals are formed of a non-porous material. Preferably, at least one of the first 38 and second 40 seals are formed of a closed cell foam. Even more preferably, the first seal 38 is formed of a closed cell foam.

A diffuser 42 is mounted to at least one of the sides of the air mixing door 32. The diffuser 42 has a plurality of passageways to interrupt a flow of air passing around the air mixing door 32 when the air mixing door 32 initially moves from one of the first and second positions to the third position, see FIG. 2B. The diffuser 42 therefore controls an initial flow of air through at least one of the quadrants 18, 20, 22. The diffuser 42 is designed to significantly reduce and/or eliminate any sudden rush of air when the air mixing door 32 moves from a seated position, i.e., the first or second position. Preferably, the diffuser 42 is formed of an elastic material such that the diffuser 42 compresses when one of the first 38 and second 40 seals seats against the housing 12, see FIG. 2A. Also, the diffuser 42 is preferably formed of a porous material which defines the passageways. In the most preferred embodiment, the diffuser 42 is disposed on the second side 36 of the air mixing door 32 and is formed of an open cell foam. Various embodiments of the diffuser 42 have been contemplated and are separately discussed in greater detail below with reference to the additional Figures. It should be appreciated that the diffuser 42 may have further design modifications without deviating from the overall scope of the subject invention.

As shown in FIGS. 2A–2C, the diffuser 42 includes first and second layers each formed of an elastic porous material. In the preferred embodiment, at least one of the first 38 and second 40 seals is disposed therebetween. Even more preferably, the seal 38, 40 disposed between the first and second layers of elastic porous material is formed of a polyester film. Specifically, the polyester film could be Mylar®, which is manufactured and sold by Dupont®. The first and second layers of the diffuser 42 are mounted to the second side 36 of the air mixing door 32 such that the second seal 40 is defined as the polyester film. The first and second layers are formed of open cell foam such that the layers compress when the polyester film seats against the housing 12, see FIG. 2A. As shown in FIG. 2B, the diffuser 42 interrupts the flow of air passing around the air mixing door 32 when the air mixing door 32 initially moves from the second position to the third position. Alternatively, the first and second layers of elastic porous material may be bonded together without a polyester film disposed therebetween. The first and second layers may be bonded by an adhesive or by melting the layers. The adhesive or melting can act as an appropriate seal. Further the layers themselves may create a seal during compression when seated against the housing 12. Finally, the diffuser 42 may be a single layer of open cell foam that compresses to create a seal.

Figure 3A:
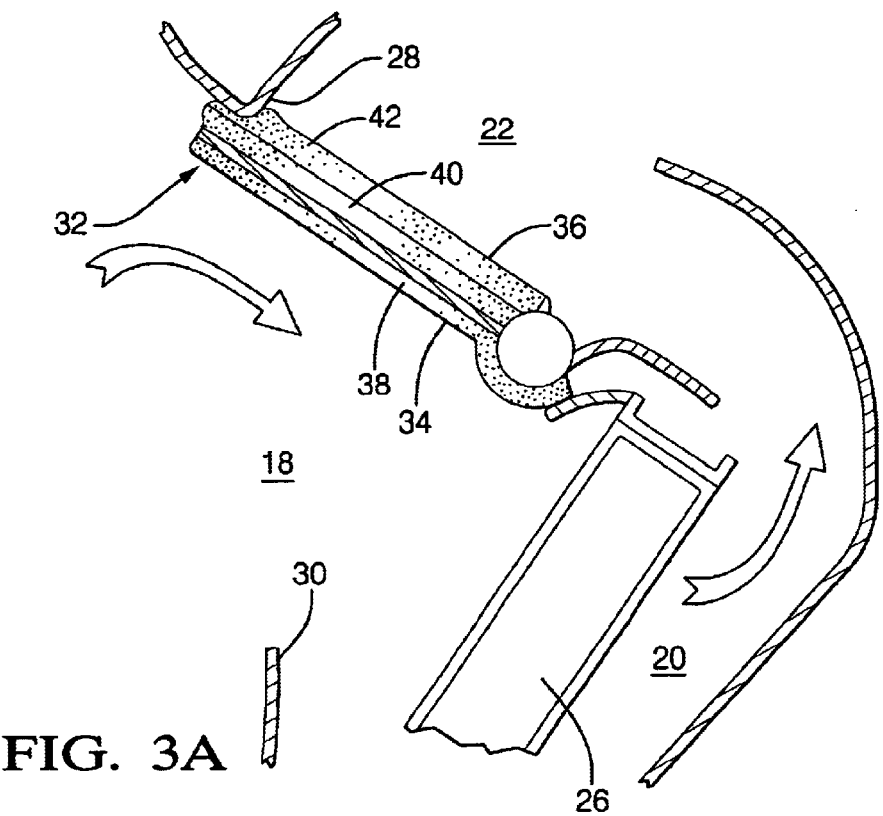
FIG. 3A is a cross-sectional view of an alternative air mixing door in a second position.
Figure 3B:
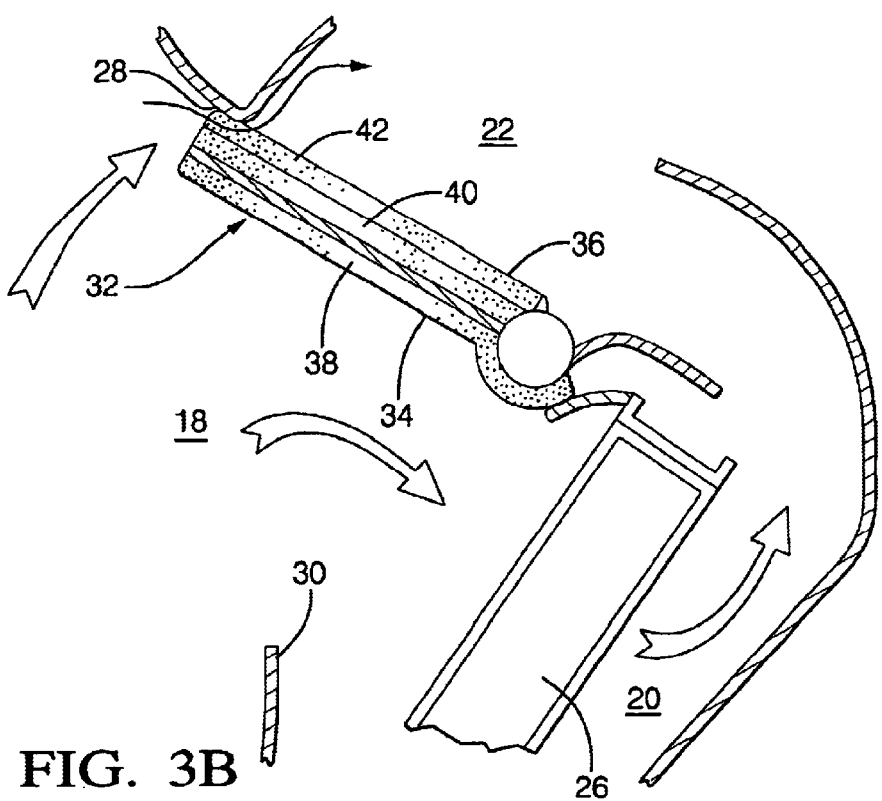
FIG. 3B is a cross-sectional view of the alternative air mixing door of FIG. 3A in a third position.
Figure 3C:
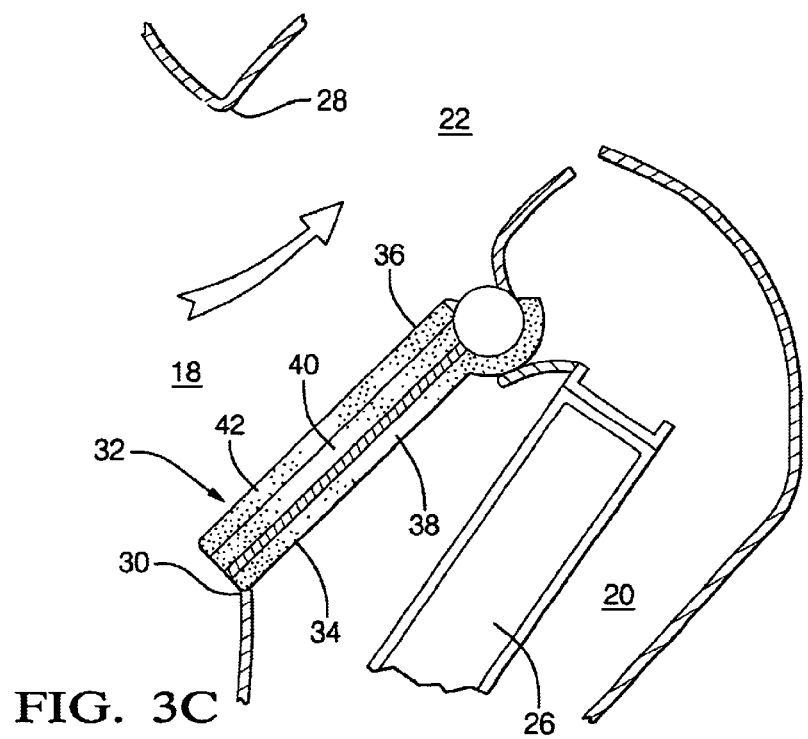
FIG. 3C is a cross-sectional view of the alternative air mixing door of FIG. 3A in a first position.
Figure 3D:
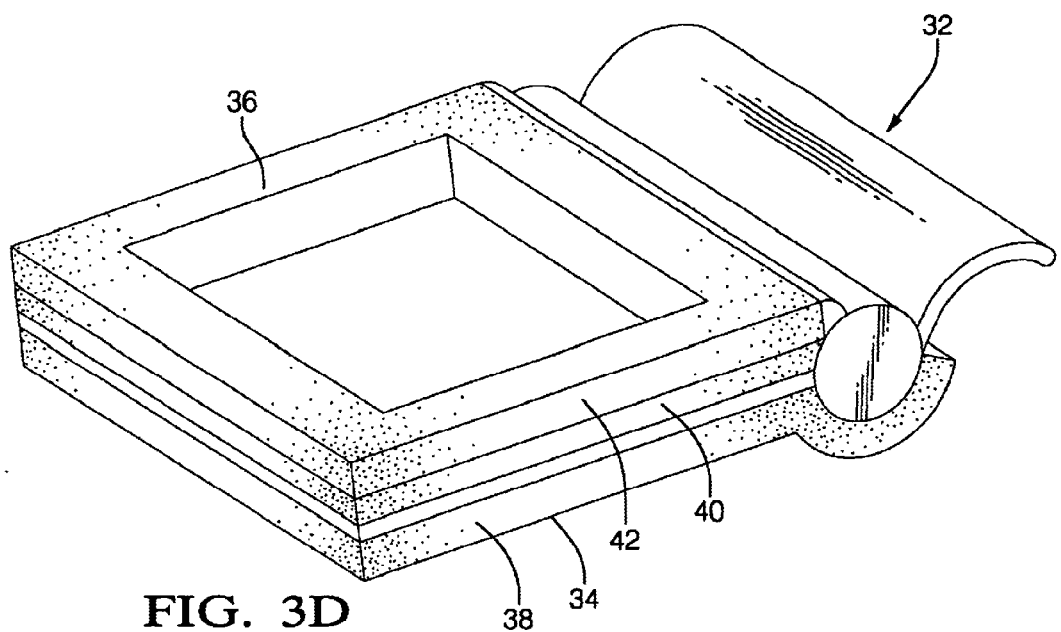
FIG. 3D is a perspective view of the alternative air mixing door of FIG. 3A.
Figure 4A:
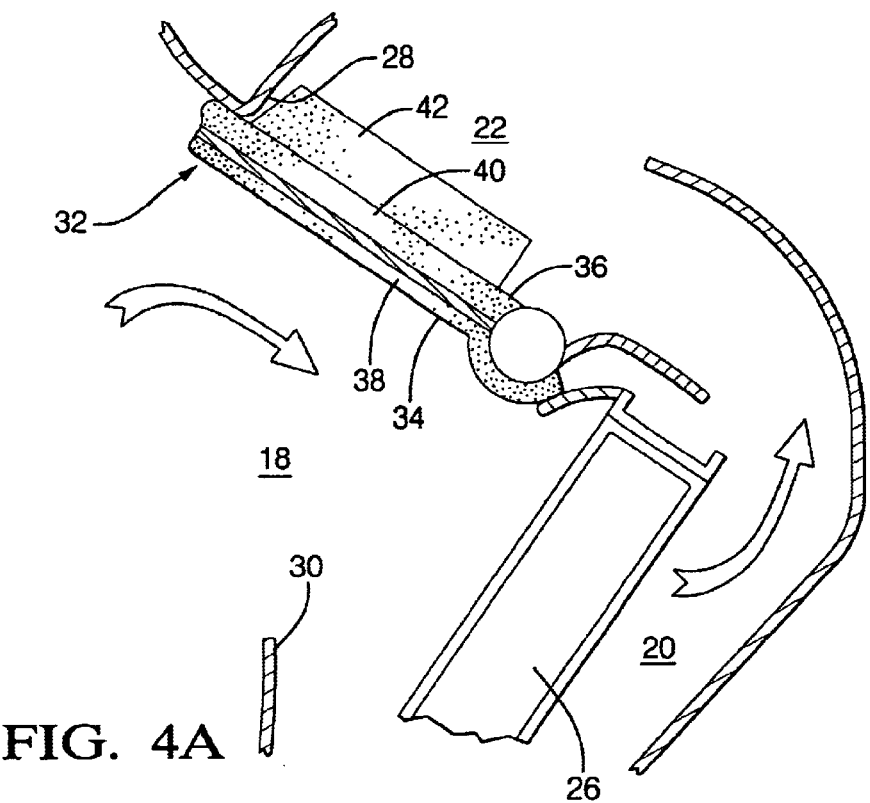
FIG. 4A is a cross-sectional view of another alternative air mixing door in a second position.
Figure 4B:
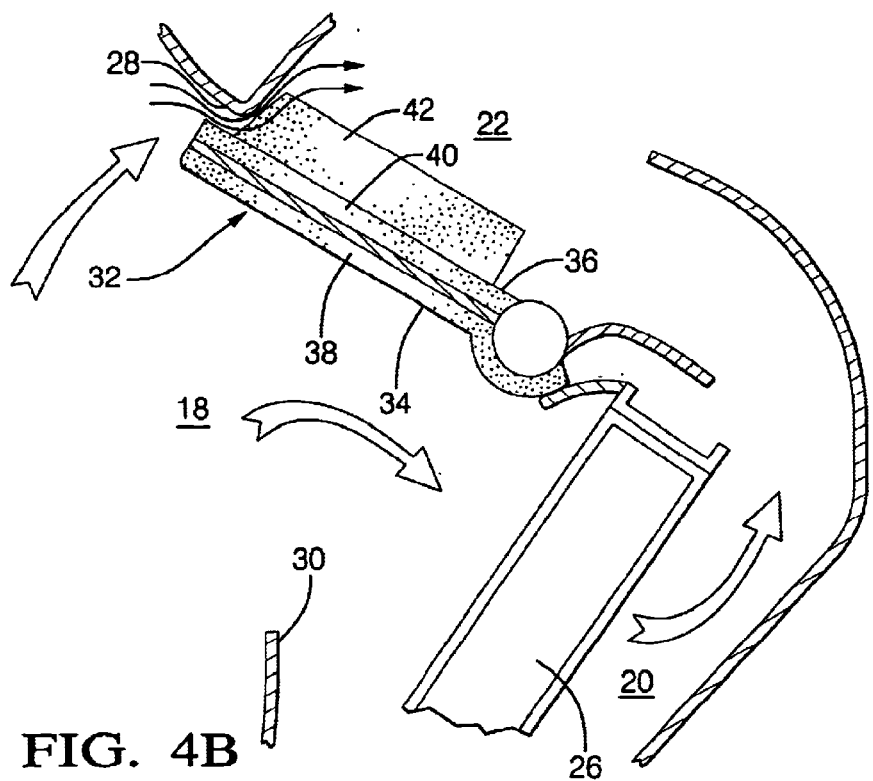
FIG. 4B is a cross-sectional view of the alternative air mixing door of FIG. 4A in a third position.
Figure 4C:
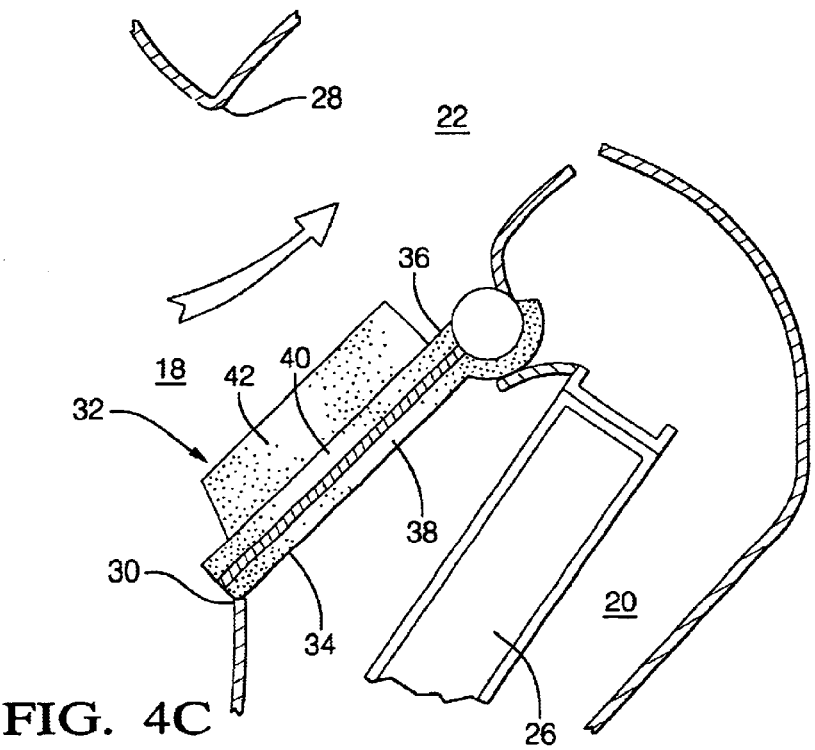
FIG. 4C is a cross-sectional view of the alternative air mixing door of FIG. 4A in a first position.
Figure 4D:
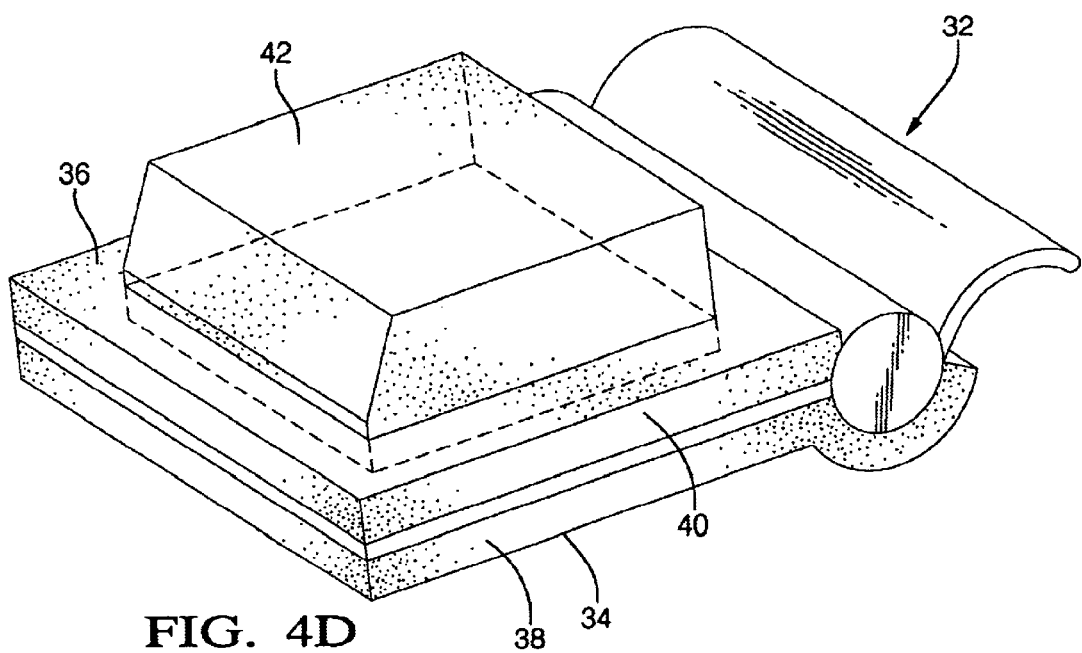
FIG. 4D is a perspective view of the alternative air mixing door of FIG. 4A.

Referring to FIGS. 3A–3D, the diffuser 42 is mounted to one of the first 38 and second 40 seals. Preferably, the diffuser 42 is mounted to the second seal 40 with both the diffuser 42 and the second seal 40 mounted to a perimeter of the air mixing door 32, see FIG. 3D. The diffuser 42 is formed of an elastic porous material, preferably open cell foam, which compresses when the second seal 40 seats against the housing 12, see FIG. 3A. As shown in FIG. 3B, the diffuser 42 interrupts the flow of air passing around the air mixing door 32 when the air mixing door 32 initially moves from the second position to the third position.

Referring to FIGS. 4A–4D, the diffuser 42 is disposed inwardly from a perimeter of the air mixing door 32 such that both of the first 38 and second 40 seals seat directly against the housing 12. The diffuser 42 is mounted directly to the second side 36 of the air mixing door 32, see FIG. 4D, and the second seal 40 is mounted to a perimeter of the air mixing door 32. The diffuser 42 is formed of an elastic porous material having a thickness greater than a thickness of the second seal 40 with the thickness of the diffuser 42 being maintained when the second seal 40 seats against the housing 12, see FIG. 4A.

Figure 5:
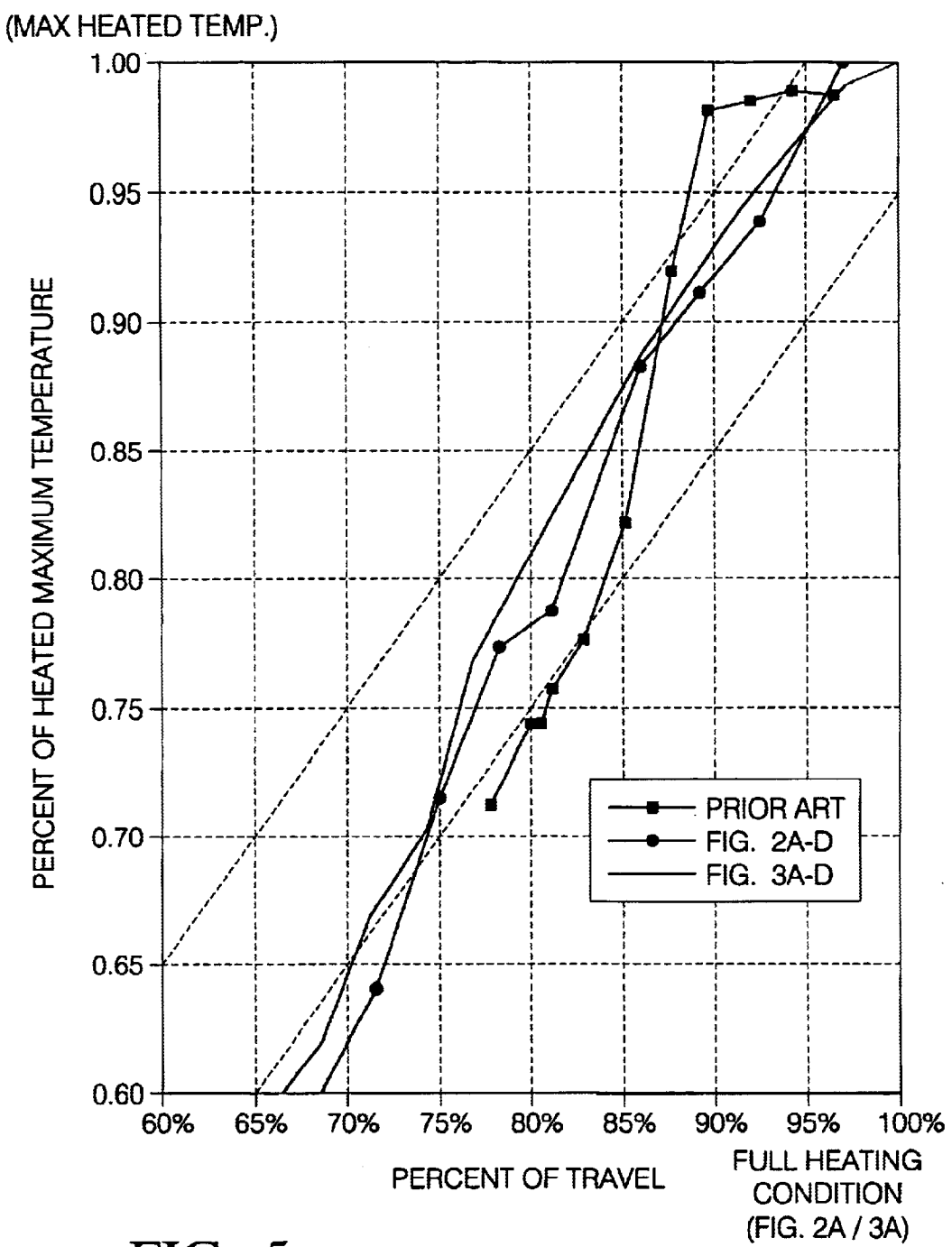
FIG. 5 is a graph representing the percent of heated maximum temperature verses the percent of travel for an air mixing door.

Referring to FIG. 5, a graph representing the percent of heated maximum temperature verses the percent travel of the air mixing doors 32 is shown. In particular, a prior art air mixing door 32, the air mixing door 32 of FIGS. 2A–2D, and the air mixing door 32 of FIGS. 3A - 3D are all graphically illustrated. As shown in the top right hand corner, the maximum (100%) of the heated temperature is obtained when the percent of travel for the air mixing doors 32 reaches the full heating condition (100%). As set forth above, the full heating condition is shown in FIGS. 2A and 3A. As the air mixing doors 32 move toward the full air conditioning condition, FIGS. 2C and 3C, the percent of travel decreases and the percent of heated maximum temperature decreases. The percent of heated maximum temperature is decreasing because the heated air is being blended with cool air passing through the cooling aperture 28. The optimum range for maintaining a uniform temperature change is illustrated with a pair of parallel dashed lines. As is clearly illustrated, the embodiment of FIGS. 2A–2D and 3A–3D, maintain a substantially uniform temperature change, especially in comparison to the prior art air mixing doors 32.

Obviously, many modifications and variations of the present invention are possible in light of the above teachings and the invention may be practiced otherwise than as specifically described within the scope of the appended claims.

What is claimed is:

1. A heating, ventilating, and air conditioning assembly for heating, venting, and cooling a passenger compartment of a vehicle, said assembly comprising;
   a housing having an inlet and at least one outlet for directing a flow of air into the passenger compartment, said housing defining first and second quadrants disposed between said inlet and outlet;
   at least one heat exchanger-disposed within said housing downstream of said inlet and upstream of said outlet;
   an air mixing door, having first and second sides, mounted to said housing downstream of said inlet and upstream of said outlet with said air mixing door having a first position for directing substantially all of the air through said first quadrant, a second position for directing substantially all of the air through said second quadrant, and a third position for directing a flow of air through both of said first and second quadrants;
   a first seal mounted to said first side of said air mixing door with said first seal seating against said housing when said air mixing door is in said first position;
   a second seal mounted to said second side of said air mixing door with said second seal seating against said housing when said air mixing door is in said second position; and
   a diffuser mounted to at least one of said sides of said air mixing door with said diffuser having a plurality of passageways to interrupt a flow of air passing around said air mixing door when said air mixing door initially moves from one of said first and second positions to said third position, thereby controlling an initial flow of air into at least one of said quadrants.

2. An assembly as set forth in claim 1 wherein said diffuser is formed of an elastic material such that said diffuser compresses when one of said first and second seals seats against said housing thereby closing said passageways.

3. An assembly as set forth in claim 2 wherein said diffuser is formed of an open cell foam.

4. An assembly as set forth in claim 1 wherein said first and second seals are formed of a non-porous material.

5. An assembly as set forth in claim 4 wherein at least one of said first and second seals are formed of a closed cell foam.

6. An assembly as set forth in claim 5 wherein said first seal is formed of a closed cell foam.

7. An assembly as set forth in claim 1 wherein said diffuser is disposed on said second side of said air mixing door.

8. An assembly as set forth in claim 7 wherein said diffuser is formed of an open cell foam and said first seal is formed of a closed cell foam.

9. An assembly as set forth in claim 8 wherein said at least one heat exchanger includes an evaporator and a heater core with said heater core disposed downstream of said evaporator.

10. An assembly as set forth in claim 1 wherein said diffuser includes first and second layers each formed of an elastic porous material with at least one of said first and second seals disposed therebetween.

11. An assembly as set forth in claim 10 wherein said seal disposed between said first and second layers of elastic porous material is formed of a polyester film.

12. An assembly as set forth in claim 11 wherein said first and second layers of said diffuser are mounted to said second side of said air mixing door such that said second seal is defined as said polyester film.

13. An assembly as set forth in claim 12 wherein said first and second layers are formed of open cell foam such that said layers compress when said polyester film seats against said housing, thereby closing said passageways.

14. An assembly as set forth in claim 1 wherein said diffuser is mounted to one of said first and second seals.

15. An assembly as set forth in claim 14 wherein said diffuser is mounted to said second seal with both said diffuser and said second seal mounted to a perimeter of said air mixing door.

16. An assembly as set forth in claim 15 wherein said diffuser is formed of an elastic porous material which compresses when said second seal seats against said housing, thereby closing said passageways.

17. An assembly as set forth in claim 1 wherein said diffuser is disposed inwardly from a perimeter of said air mixing door such that both of said first and second seals seat directly against said housing.

18. An assembly as set forth in claim 17 wherein said diffuser is mounted directly to said second side of said air mixing door and said second seal is mounted to a perimeter of said air mixing door.

19. An assembly as set forth in claim 18 wherein said diffuser is formed of an elastic porous material having a thickness greater than a thickness of said second seal with said thickness of said diffuser being maintained when said second seal seats against said housing.

* * * * *